United States Patent
Fey et al.

(10) Patent No.: US 6,812,589 B1
(45) Date of Patent: Nov. 2, 2004

(54) CIRCUIT FOR ACTIVATING A CAN (CAR AREA NETWORK) BUS CONTROL UNIT

(75) Inventors: Wolfgang Fey, Niedernhausen (DE); Leonhard Link, Hofheim (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 184 days.

(21) Appl. No.: 10/149,360

(22) PCT Filed: Oct. 21, 2000

(86) PCT No.: PCT/EP00/10382
§ 371 (c)(1),
(2), (4) Date: Jun. 7, 2002

(87) PCT Pub. No.: WO01/42054
PCT Pub. Date: Jun. 14, 2001

(30) Foreign Application Priority Data

Dec. 10, 1999 (DE) .......................................... 199 59 487
Mar. 10, 2000 (DE) .......................................... 100 11 775

(51) Int. Cl.$^7$ .............................. B60L 1/14; H02G 3/00
(52) U.S. Cl. .................... 307/10.8; 307/10.3; 307/10.6; 331/111
(58) Field of Search ................... 307/10.1, 10.2, 307/10.3, 10.4, 66, 18, 358, 10.8, 10.6; 331/111, 143; 327/79

(56) References Cited

U.S. PATENT DOCUMENTS

| | | | | |
|---|---|---|---|---|
| 4,137,504 A | * | 1/1979 | Simmons | 327/79 |
| 4,652,837 A | * | 3/1987 | D'Arrigo et al. | 331/111 |
| 4,672,635 A | * | 6/1987 | Fischer | 375/317 |
| 5,751,746 A | | 5/1998 | Strauss | |

FOREIGN PATENT DOCUMENTS

| | | |
|---|---|---|
| DE | 3913113 | 10/1990 |
| DE | 19715880 | 7/1998 |
| DE | 19904721 | 8/1999 |
| EP | 0870648 | 10/1998 |

OTHER PUBLICATIONS

Search Report of German Patent Office for Appln No. 10011775.9 no date.

* cited by examiner

Primary Examiner—Rajnikant B. Patel
(74) Attorney, Agent, or Firm—Honigman Miller Schwartz and Cohn LLP

(57) ABSTRACT

The present invention describes a circuit for activating a control unit such as an ABS controller in a vehicle by way of a CAN bus, with the ignition turned off, which is in particular characterized by a first input for a logic activation signal for the control unit, an input filter for suppressing disturbing pulses in the activation signal, and a device for producing an output signal (CAN_WU) that activates the control unit when a predeterminable number of activation signals is recorded within a predeterminable duration.

8 Claims, 2 Drawing Sheets

CIRCUIT FOR ACTIVATING A CAN (CAR AREA NETWORK) BUS CONTROL UNIT

TECHNICAL FIELD

The present invention generally relates to bus control units, and more particularly relates to a circuit for activating a control unit by way of a CAN bus.

BACKGROUND OF THE INVENTION

Generally all electric and electronic control units, ESP sensors or other components are interconnected by way of a standardized CAN (Car Area Network) bus in modern vehicles. The mutual communication of these units is organized by way of a central CAN bus controller, wherein one CAN computer for producing a corresponding data protocol and one CAN bus transceiver, by which the unit is connected to the CAN bus, is associated with each unit.

When the vehicle is not in operation, the CAN bus and the mentioned units are completely or partly inactive, i.e., they are in a sleeping condition and become fully active again only after the ignition is switched on. However, it has proved desirable to be able to activate certain units, such as the ABS control device, also when the ignition is switched off, namely by release of the central locking system or by a 'wake-up signal', produced in any other fashion.

BRIEF SUMMARY OF THE INVENTION

An object of the present invention is to provide a circuit of the type mentioned hereinabove by which a control unit (such as an ABS controller, or another control unit, or also ESP sensors, etc.) can be activated in a defined and reliable manner by way of the CAN bus when the ignition is turned off.

This object is achieved by a circuit comprising a first input for a logic activation signal for the control unit, an input filter for suppressing disturbing pulses in the activation signal, and a device for producing an output signal that activates the control unit when a predeterminable number of activation signals is sensed within a predeterminable duration.

A special advantage of this solution includes that an inadvertent activation by disturbing signals is almost precluded. Further, the circuit can be achieved with a small number of logical construction elements so that the energy consumption may be kept very low.

DETAILED DESCRIPTION OF THE PREFERRED EMBODIMENTS

Figure 1:
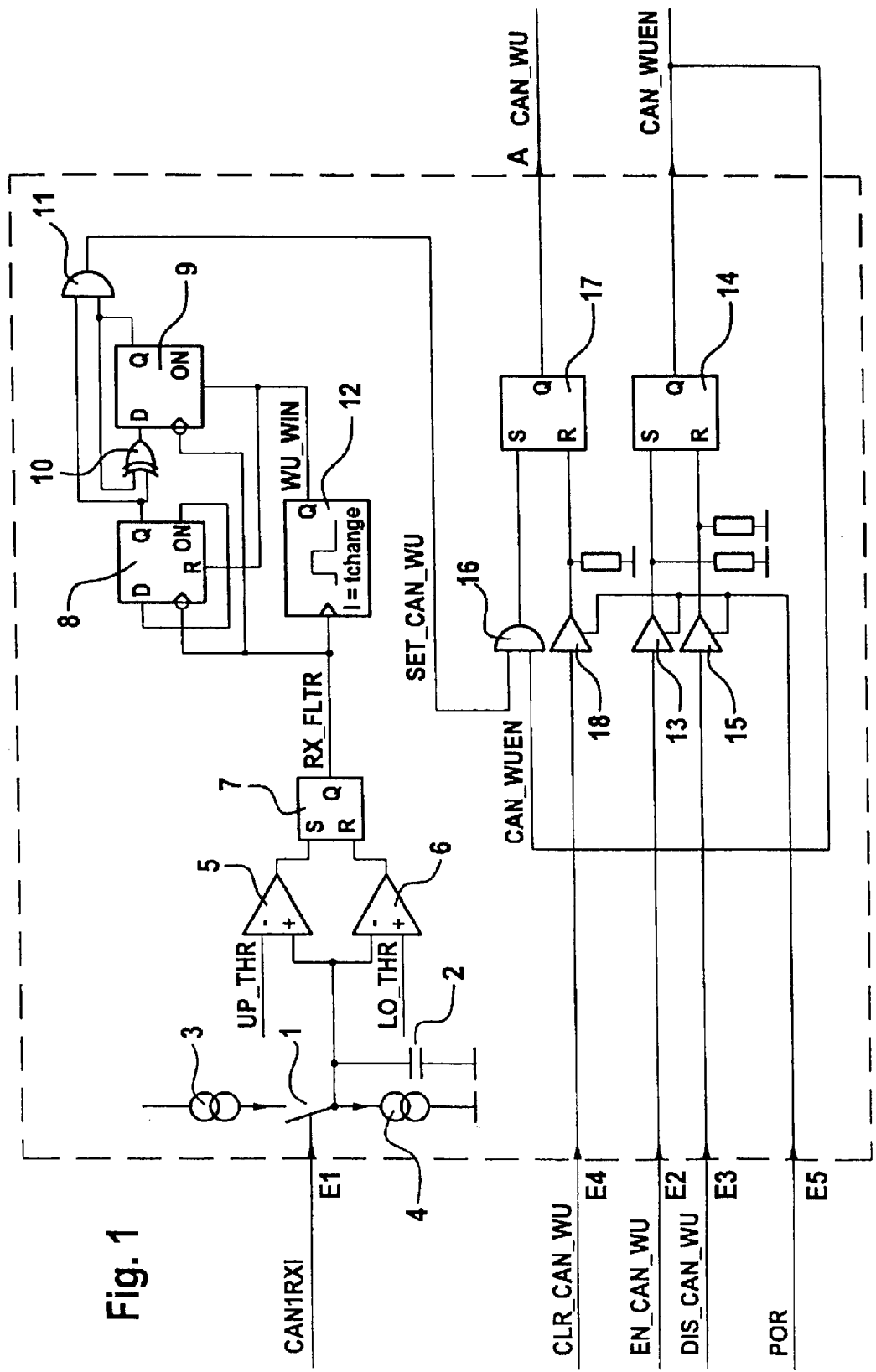
FIG. 1 is a block diagram of such an embodiment.

FIG. 1 shows a circuit according to the present invention which is intended for use in activating an ABS controller when the CAN bus is generally deactivated, with the ignition turned off. The circuit is interposed between the actual ABS controller and a CAN bus transceiver (not shown) associated with the controller, the said transceiver being in turn connected to the CAN bus in a known fashion.

To permit a defined activation of the ABS controller as addressed CAN bus unit when the ignition is turned off, the activation signal ('activation request') received by the CAN bus transceiver must be identified and tested so that the ABS controller is not activated inadvertently by disturbing signals.

For this purpose, the input signal CAN1RXI which represents a request for activation and is applied to a first input E1 of the circuit undergoes a three-stage test, and an output signal which actually activates the ABS controller will not be produced at the output A of the circuit until the input signal has successfully passed this test. The circuit is set into its operating condition or deactivated by a microcontroller by way of further inputs and is reset to its previous condition after the output signal is produced.

The input signal CAN1RXI is produced by the associated CAN bus transceiver and illustrates the differential signal levels of the CAN bus on logical levels. An analog filter which shows a first step is used to suppress disturbing pulses. To this end, a logical 1-level of the input signal closes a switch 1 so that a capacitor 2 is charged by way of a first current source 3 for the duration of the 1-level. The capacitor 2 is discharged accordingly by way of a second current source 4 by a logical 0-level of the input signal where the switch 1 is open.

The voltage built up at the capacitor 2 is compared to a top and a bottom threshold value UP_THR, LO_THR. Two comparators 5, 6 comprised of each one operational amplifier are provided to this end, and the capacitor voltage is applied to a connection between a non-inverting and an inverting input of the first or second operational amplifier, and the top threshold value prevails at the inverting input of the first operational amplifier, and the bottom threshold value prevails at the non-inverting input of the second operational amplifier in the form of corresponding voltage levels.

The output of the first operational amplifier or comparator 5 is connected to a set input S of a first RS flip-flop 7, while the output of the second operational amplifier or comparator 6 is applied to a reset input R of this RS flip-flop 7.

When the capacitor voltage reaches the top threshold voltage UP_THR, the first comparator 5 will switch over and cause the first RS flip-flop 7 to flip, that means, the signal RX_FLTR applied to its output Q will adopt a logical 1-level. When the capacitor voltage reaches the bottom threshold value LO_THR in the opposite case, the second comparator 6 will switch over and reset the RS flip-flop 7 so that said's output signal RX_FLTR adopts a logical 0-level.

The two threshold values have a relatively great voltage difference due to which, along with the capacity of the capacitor 2 and the currents flowing through the current sources 3, 4, a minimum filter time 'tmin' is predetermined in a fashion that disturbing pulses at the first input E1 due to their rapid change cannot charge or discharge the voltage at the capacitor 2 sufficiently in order to effect switching of the comparators 5, 6 and, thus, a change of the signal RX_FLTR prevailing at the output of the RS flip-flop 7.

It is determined by the second stage whether the input signal has a defined minimum number of current level variations. For this purpose, the declining edges of the output signal RX_FLTR of the first RS flip-flop 7 are counted by a counter which is conventionally comprised of two D flip-flops 8, 9, a NOR gate 10, and a first AND gate 11 connected to one another. A counter output signal SET_CAN_WU which prevails at the output of the first AND gate 11 is set to the logical 1-level at a count value of '3'.

It is finally checked in a third stage whether the distance of time of these current level variations exceeds an allowed maximum value. A monoflop 12 is provided for this purpose having an input that is triggered by the output signal RX_LTR of the first RS flip-flop 7 and an output that is connected to the reset inputs of the two D flip-flops 8, 9. The time constant of the monoflop represents the maximum time 'tchange' which may lapse until a new current level variation occurs. When the time value falls short of this time constant, the monoflop 12 is triggered again by the output signal RX_FLTR so that its output signal WU_WIN remains on the logical 1-level. When, however, the monoflop is not triggered before the expiry of its time constant, its output level WU_WIN switches to the logical 0-level, with the result that the two D flip-flops 8, 9 and, thus, the counter are reset, and a new counting operation begins.

This circuit is activated manually or automatically (i.e., switched into a wake-up mode) by way of the CAN controller of the CAN bus (not shown) before the driver turns off the ignition. When the ignition is turned on again and the CAN bus is thereby set into operation, the circuit is no longer necessary so that it is deactivated again by way of the controller.

For this purpose, the circuit has a second and a third input E2, E3 to which an activation signal EN_CAN_WU or a deactivation signal DIS_CAN_WU is applied. The activation signal is sent by way of a first inverter 13 to a set input S of a second RS flip-flop 14, while the deactivation signal is applied to a second reset input R of this second RS flip-flop 14 by way of a second inverter 15. The output signal CAN_WUEN of the second RS flip-flop 14 is linked to the output signal SET_CAN_WU of the counter by way of a second AND gate 16 and acts upon a third RS flip-flop 17 whose output signal CAN_WU is applied to the output A of the circuit and activates the ABS controller.

The third RS flip-flop 17 can be reset by the controller with a signal CLR_CAN_WU by way of a fourth input E4 which is connected by way of a third inverter 18 to the reset input R of the third RS flip-flop 17.

By way of a fifth input E5 of the circuit, a reset signal POR is sent by which the first, second, and third inverter 13, 15, 18 is reset when the voltage is switched on.

Figure 2:
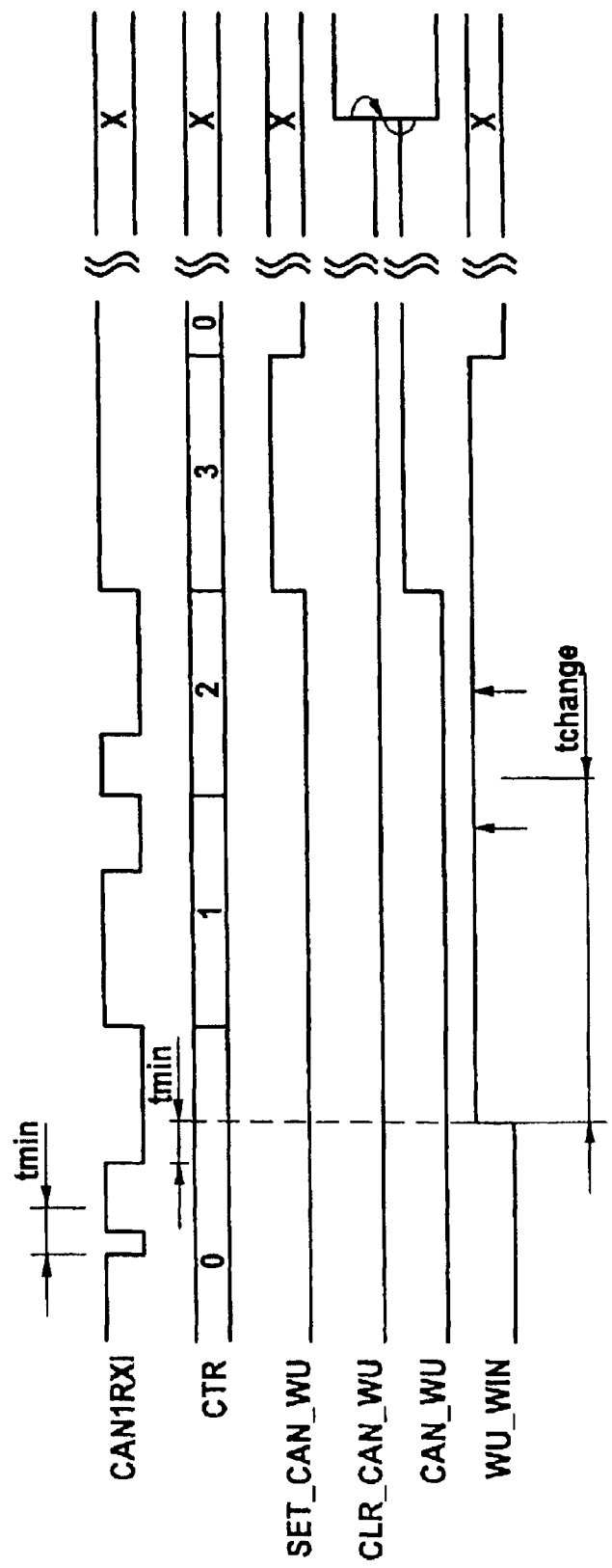
FIG. 2 shows a time diagram of different voltage variations in the circuit shown in FIG. 1.

FIG. 2 shows for an exemplary first input signal CAN1RXI the time variations of the most important signals in this circuit, namely, of the counter reading CTR, of the output signal SET_CAN_WU of the counter, of the reset signal CLR_CAN_WU for the circuit, of the output signal CAN_WU of the circuit, as well as of the output signal WU_WIN of the monoflop 12.

Further, the minimum filter time 'tmin' is marked at the first input signal for which time at least a logical 1-level or 0-level must exist to be able to charge or discharge the capacitor 2, as described hereinabove, until the top or bottom threshold value. In addition, the maximum allowed period 'tchange' between two pulses to be counted is plotted.

Consequently, the rising edges of those pulses of the input signal CAN1RXI are counted with the counter which are longer than the minimum filter time 'tmin'. With each third edge the counter produces the output signal SET_CAN_WU which, in the case in which the output signal WU_WIN of the monoflop 12 has not prematurely reset the counter due to an excessive distance of time of the edges, is available as output signal CAN_WU (with logical 1-level) at the output A of the circuit, by way of the third RS flip-flop 17, for the activation of the ABS controller. The circuit may then be reset again by the reset signal CLR_CAN_WU, with the result that the output signal CAN_WU re-assumes its logical 0-level.

What is claimed is:

1. A system for activating an ABS control unit by way of a bus,
   an ABS control unit having a bus transceiver,
   a circuit having first, second and third portions, wherein said first portion is adapted to receive logic activation signals, and wherein said second portion includes an input filter for suppressing disturbing pulses in the logic activation signal, and wherein said third portion includes an output signal generator for generating an output signal that simulates a normal bus signal and activates the ABS control unit by way of the bus transceiver when a predetermined number of logic activation signals are received within a predetermined direction.

2. The system as claimed in claim 1, wherein said bus transceiver is activated by differential bus signals.

3. The system as claimed in claim 1, wherein the input filter has a filter time by which disturbing pulses having a duration that is short compared to a logical level of the activation signal are filtered out.

4. The system as claimed in claim 1, wherein said transceiver is a CAN bus transceiver, wherein the logical activation signal is produced from a differential CAN bus signal, and wherein the input filter has a filter time by which disturbing pulses with a duration that is short compared to a logical level of the activation signal are filtered out.

5. The system as claimed in claim 1, wherein the input filter includes a first and a second current source and a capacitor which is charged or discharged by way of the first or second current source in dependence on the logical level of the activation signal, as well as a first and a second comparator by which a first flip-flop is set or reset when the capacitor voltage reaches a top or bottom threshold value.

6. The system as claimed in claim 1, wherein the output signal generator includes a counter and a monoflop to which is applied a current logic activation signal, wherein a counter after each third activation signal produces the output signal and is reset by the monoflop after expiry of the predeterminable time period.

7. The system as claimed in claim 1, including a second input for a signal activating the circuit, as well as a third input for a signal deactivating the circuit, wherein the second input is connected to a set input of a second RS flip-flop, and the third input is connected to a reset input of the second RS flip-flop, and the output of the second RS flip-flop is linked to the output signal of the counter by means of a second AND gate.

8. The system as claimed in claim 7, further including a third RS flip-flop whose set input is connected to the output of the second AND gate and whose reset input is connected to a fourth input of the circuit, to which a reset signal for the circuit can be applied, wherein the output of the third RS flip-flop is connected to an output of the circuit.

* * * * *

UNITED STATES PATENT AND TRADEMARK OFFICE
CERTIFICATE OF CORRECTION

PATENT NO. : 6,812,589 B1
DATED : November 2, 2004
INVENTOR(S) : Wolfgang et al.

It is certified that error appears in the above-identified patent and that said Letters Patent is hereby corrected as shown below:

<u>Column 4,</u>
Line 46, please change "in claim 1, including" to -- in claim 1, further including --.

Signed and Sealed this

Seventeenth Day of May, 2005

JON W. DUDAS
*Director of the United States Patent and Trademark Office*